United States Patent Office 2,770,525
Patented Nov. 13, 1956

2,770,525

PREPARATION OF ALKALI METAL CYANATES

Alfred Gordon Houpt, Stamford, Conn., assignor to American Cyanamid Company, New York, N. Y., a corporation of Maine No Drawing. Application March 3, 1954,
Serial No. 413,957

11 Claims. (Cl. 23—75)

This invention relates to an improvement in the preparation of alkali metal cyanates. More particularly the invention is concerned with the fusion reaction of an organic nitrogen compound with an alkali metal carbonate in a titanium vessel to form an alkali metal cyanate of low cyanide content.

The fusion reaction of organic nitrogen compounds with alkali metal carbonates to yield alkali metal cyanates is well known. Such cyanates have been ordinarily prepared in vessels commercially available, e. g., iron pots. These products, however, contained excessive amounts of alkali metal cyanide due to the thermal decomposition of ammonia that is formed during reaction, resulting in the reduction of cyanates to cyanides. For some purposes such as weed killing, these excessive amounts of poisonous cyanide rendered the cyanates commercially worthless, owing to the danger to persons handling and applying a contaminated cyanate spray.

Prior to the present invention, probably the best method known for producing alkali metal cyanates free from excessive amounts of cyanide was to conduct the old cyanate reaction in an aluminum vessel. However, that process is not entirely satisfactory. That process is limited to temperatures which are below the softening temperature of aluminum, namely 550° C. Further, the reaction time in that process is thirty minutes or more. If in that environment the time is decreased or temperature increased, a cyanate of low cyanide content cannot be readily realized. In all prior art methods for commercially producing cyanates of low cyanide content from the alkali carbonate and organic nitrogen compound fusion reaction, there was no feasible method for readily accomplishing this result since a practical and effective means for minimizing the thermal decomposition of ammonia that reduces the cyanate to cyanide was not available.

It is an object of this invention to overcome these difficulties by a fusion reaction at temperatures in excess of 550° C. for reaction times of less than a half hour. It is a further object to produce an alkali cyanate substantially free from alkali cyanide.

According to the invention, it has been found that these objectives can be realized by feeding a mixture of an alkali metal carbonate and an organic nitrogen compound to a titanium vessel maintained at a temperature in excess of 550° C. and withdrawing the thus formed alkali metal cyanate at a rate so as to minimize the formation of cyanides within the vessel. At temperatures in excess of 550° C., the reaction time was found to be less than thirty minutes.

The success of titanium as a vessel for the fusion of organic nitrogen compounds with alkali metal carbonates is surprising because the expected attack upon it by nitrogen and oxygen and fused alkali at temperatures in excess of 550° C. did not develop. Further, titanium offers several advantages over aluminum as a vessel for preparing cyanates. These advantages derive mainly from its greater strength particularly at higher temperatures. For example, short reaction times are desirable to keep the cyanide content as low as possible. However, with an aluminum vessel, the brevity of the reaction time of the charge was limited by the infeasibility of heating the aluminum vessel above about 550° C. without substantially softening it. As titanium does not seriously soften below temperatures of 850° C., it can be maintained at a considerably higher temperature than the aluminum vessel, thereby permitting considerably shorter reaction times.

While it is not known what is involved in the above described environment, it is postulated, without limitation thereto, that the efficiency of the process is greatly enhanced by the high temperature which may be applied to the titanium vessel without melting it and by the ability of the titanium to rapidly transmit the heat to the charge. Since temperatures in excess of 550° C. are employed, the time of reaction is substantially reduced accordingly to less than a half hour, thus minimizing the thermal decomposition of ammonia. In this manner, little or no hydrogen is formed and reduction of the formed cyanate to cyanide by hydrogen is precluded.

Another advantage offered by the heat stability of a titanium vessel is that it can be used to produce high grade sodium cyanate, which material is impossible of production in an aluminum vessel owing to the fact that the sodium cyanate reaction mass requires for its fusion a temperature above 550° C., which is the softening temperature of aluminum.

Thus the titanium vessel makes possible for the first time the commercial preparation of high grade sodium cyanate of low cyanide content.

The fusion temperatures of this invention range from those in excess of 550° C. to 700° C. Preferably temperatures within the range of 600°–650° C. are employed.

The vessel of the instant invention can be formed in its entirety of titanium or, if desired a titanium liner can be formed and inserted as a shell into an outer vessel of good heat conducting properties, such as iron, stainless steel, or the like. The titanium used is the ordinary ductile titanium of commerce, containing at most only a few percent of impurities or alloying metals.

The following examples will further illustrate the preparation of a sodium cyanate and a potassium cyanate, utilizing a titanium vessel. These are by way of illustration, without limiting the invention thereto.

*Example 1*

A titanium vessel of four pounds melt capacity with a vertical divider is used so that the reactants can be fed to and the reaction take place in one portion of the vessel, and the product will flow into the adjacent portion and from there be drawn off. The vessel is heated with a radiant electric furnace, but any other suitable heating means may, of course, be used. A heel of two pounds of sodium cyanate is fused in the bottom of the pot, and the temperature is brought up to 610° C. ±10° C. A mixture of 1.7 pounds commercial grade sodium carbonate (about 99% pure) and 1.0 pound of commercial grade dicyandiamide (about 99% pure) is then run into the reaction portion of the vessel slowly and permitted to fuse. The melt formed is sufficient to fill both sides of the vessel and as soon as the melt ceases bubbling, denoting substantial completion of the reaction, additional mix is added to the reaction portion of the vessel at a maximum rate such that the temperature of the vessel is maintained at 610° C. ±10° C., thereby forcing out material from the exit side which is collected and allowed to cool as pigs. This is equivalent to adding mix at the rate of about 12 to 15 pounds per hour. The addition is conveniently carried out continuously by means of a hopper feeding a vibrating trough, a number of which mechanisms are standard, and easily adjustable to provide the feed rate desired. The residence time is twenty minutes. Excellent yields of sodium cyanate are obtained. The cyanide content is less than 20 parts per million.

Among the gaseous by-products of the reaction are about 17 pounds of ammonia and 13 pounds of carbon dioxide per 100 pounds of sodium cyanate produced. These may be separated and recovered by any known means, or the mixture may be dissolved in water for use as a fertilizer.

*Example 2*

A titanium vessel of four pounds melt capacity with a vertical divider is used so that the reactants can be fed to and the reaction take place in essentially one portion of the vessel. The product could flow into the adjacent portion and from there be drawn off. The vessel is heated with a radiant heating furnace, but any other suitable heating means may be used. A heel of two pounds of potassium cyanate is fused in the bottom of the vessel which is brought up to 640° C. A mixture of 1.7 pounds of commercial grade of potassium carbonate (about 99% pure) and 0.8 pound of commercial grade dicyandiamide (about 99% pure) is then run into the reaction portion of the pot, and permitted to fuse. The melt formed is sufficient to fill both sides of the pot and as soon as the melt ceases bubbling, denoting substantial completion of the reaction, additional mix is added to the reaction portion of the vessel, thereby forcing out material from the exit side, which is collected and allowed to cool as pigs. Thereafter, additional mix is added at a maximum rate such that the temperature of the vessel is maintained at 640° C. This is equivalent to adding mix at the rate of about 30 pounds per hour. The addition is conveniently carried out continuously by means of a hopper feeding a vibrating trough, a number of which mechanisms are standard, and easily adjustable to provide the feed rate desired. The total reaction time is ten minutes. The product recovered contains 98% potassium cyanate. The cyanide content is less than 30 parts per million.

*Example 3*

Using a titanium pot and the procedure of Example 1, 4.5 pounds of urea and 3.6 pounds of potassium carbonate are reacted at 650° C. for seven minutes to give four pounds of 99.5% pure potassium cyanate. The cyanide content is less than ten parts per million.

While it is preferred to use dicyandiamide as the source of cyanate nitrogen, a wide variety of other organic nitrogen compounds, which may be added as such or produced in situ, may be used to make cyanates having low cyanide contents. Among such organic nitrogen compounds are urea, biuret, melamine, ammeline, ammelide, melam, melon, melem, guanidine carbonate, cyanuric acid and the like.

In a modification of this process, ammonia and carbon dioxide are fed into a molten mixture of alkali cyanate and alkali carbonate at temperatures above 550° C.

While the examples described herein have been on a continuous basis, they may obviously be conducted on a batch basis by simply emptying the pots completely after the evolution of the reaction gases ceases and then repeating the process. The continuous embodiment of the processes obviously is the preferred one.

It is also preferred when using dicyandiamide, to use a feed mixture of 1.2–1.5 moles of alkali carbonate to 1 mole of dicyandiamide for the best yields of cyanate.

Suitable variations and changes in the invention may be made without departing from the spirit thereof or the scope of the appended claims.

I claim:

1. In a method for preparing an alkali cyanate, the steps which comprise: fusing at temperatures in excess of 550° C. a mixture of an organic nitrogen compound and an alkali metal carbonate in a titanium vessel for a period of less than thirty minutes and recovering an alkali cyanate of low cyanide content therefrom.

2. A method according to claim 1 wherein the nitrogen compound is dicyandiamide.

3. A method according to claim 1 wherein the nitrogen compound is urea.

4. A method according to claim 1 wherein the carbonate is sodium carbonate.

5. A method according to claim 1 in which the carbonate is potassium carbonate.

6. A method according to claim 1 in which the temperature of fusion is within the range of from about 600° C. to 650° C.

7. In a method for preparing an alkali metal cyanate of low cyanide content, the steps which comprise: fusing a heel of alkali metal cyanate at a temperature in excess of 550° C. in a titanium vessel, adding thereto a mixture of alkali metal carbonate and an organic nitrogen compound, maintaining the temperature in excess of 550° C. for a period not exceeding one half an hour and removing the reaction mass therefrom.

8. A method according to claim 7 wherein the nitrogen compound is dicyandiamide.

9. A method according to claim 7 wherein the nitrogen compound is urea.

10. A method according to claim 7 in which the alkali metal carbonate is sodium carbonate.

11. In a method for preparing sodium cyanate of low cyanide content, the steps which comprise: fusing a heel of sodium cyanate at a temperature between about 600° C.–650° C. in a titanium vessel, adding thereto a mixture of sodium carbonate and dicyandiamide, maintaining the temperature between about 600° C.–650° C. for a period not exceeding one half an hour and recovering the reaction mass therefrom.

References Cited in the file of this patent

UNITED STATES PATENTS

| | | |
|---|---|---|
| 2,546,551 | Lento | Mar. 27, 1951 |
| 2,644,820 | Gresham | July 7, 1953 |

OTHER REFERENCES

Jaffee and Blocher: "The Technology of Titanium," in Modern Metals, August 1952, page 62.